(12) United States Patent
Chin et al.

(10) Patent No.: US 7,398,280 B1
(45) Date of Patent: Jul. 8, 2008

(54) METHOD AND SYSTEM FOR MANUFACTURING INTEGRATED CIRCUITS MEETING SPECIAL CUSTOMER REQUIREMENTS WITH MULTIPLE SUBCONTRACTORS IN REMOTE LOCATIONS

(75) Inventors: Mun Tutt Chin, Penang (MY); Weng Hong Kwan, Penang (MY); Gary John Rangel, Penang (MY); Siew Tian Lu, Nibong Tebal (MY)

(73) Assignee: Altera Corporation, San Jose, CA (US)

( * ) Notice: Subject to any disclaimer, the term of this patent is extended or adjusted under 35 U.S.C. 154(b) by 475 days.

(21) Appl. No.: 10/606,258

(22) Filed: Jun. 24, 2003

(51) Int. Cl.
*G06F 7/00* (2006.01)
*G06F 17/00* (2006.01)

(52) U.S. Cl. .................. 707/104.1; 438/128; 438/129

(58) Field of Classification Search ............ 707/104.1, 707/100; 716/18; 438/128, 129
See application file for complete search history.

(56) References Cited

U.S. PATENT DOCUMENTS

| | | | | |
|---|---|---|---|---|
| 5,594,639 A | * | 1/1997 | Atsumi | 700/107 |
| 6,153,450 A | * | 11/2000 | Deguchi | 438/130 |
| 6,174,742 B1 | * | 1/2001 | Sudhindranath et al. | 438/14 |
| 6,236,952 B1 | * | 5/2001 | Jun et al. | 702/119 |
| 6,338,972 B1 | * | 1/2002 | Sudhindranath et al. | 438/14 |
| 6,720,194 B1 | * | 4/2004 | Miller et al. | 438/14 |
| 2003/0074391 A1 | * | 4/2003 | Carter et al. | 709/200 |
| 2004/0128641 A1 | * | 7/2004 | Broberg et al. | 716/18 |

OTHER PUBLICATIONS

Sedra et al. "Microelectronic circuits", Oxford University Press, 1998, pp. 354-358.*

* cited by examiner

*Primary Examiner*—Hosain Alam
*Assistant Examiner*—Usmaan Saeed
(74) *Attorney, Agent, or Firm*—Morgan, Lewis & Bockius LLP

(57) ABSTRACT

Disclosed are a method and system for manufacturing integrated circuits meeting special customer requirements with multiple subcontractors in remote locations. The disclosed manufacturing automation execution system detects customer special requirements and keeps track of such special requirements throughout the manufacturing process. The system accesses various databases to retrieve relevant data for determining and issuing electronic die release orders to subcontractors in remote locations. The disclosed method and system enable a broader range of services in manufacturing integrated circuits.

21 Claims, 6 Drawing Sheets

METHOD AND SYSTEM FOR MANUFACTURING INTEGRATED CIRCUITS MEETING SPECIAL CUSTOMER REQUIREMENTS WITH MULTIPLE SUBCONTRACTORS IN REMOTE LOCATIONS

RELATED APPLICATION

The application relates to U.S. patent application Ser. No. 10/389,380, filed Mar. 13, 2003, entitled Alert Mechanism And Method For Monitoring Remote System Process Of Time Critical Data Via The Internet, which is incorporated herein by reference.

FIELD OF THE INVENTION

The present invention relates generally to the field of manufacturing of integrated circuits, and more specifically to manufacturing integrated circuits meeting special customer requirements with multiple subcontractors in remote locations.

BACKGROUND OF THE INVENTION

The manufacture of integrated circuit devices is a very complicated process. A manufacturer often needs the support of a number of subcontractors to successfully produce integrated circuit devices for its customers. FIG. 1 illustrates a common approach that many companies utilize in manufacturing integrated circuit devices. As shown in FIG. 1, the process starts when an integrated circuit manufacturer 100 receives a production order from a customer 102. Upon receiving the production order, it engages a number of subcontractors, such as semiconductor foundries 104, assembly and packaging subcontractors 106, testing subcontractors 108 and material suppliers 110 in manufacturing the integrated circuit devices to satisfy the customer's production order.

In the approach illustrated in FIG. 1, the semiconductor foundries 104 normally produce multiple semiconductor wafers at one time. A 'lot' usually contains a number of wafers ranging from 1 to 25. Each wafer may contain thousands of copies of an integrated circuit design. Each copy of such integrated circuit design is called a 'die' or a chip. The wafers are sent to assembly and packaging subcontractors 106 where each die is cut from a wafer and put into a package. Next, each package is tested by testing subcontractors 108 before it is sent to the customer. The material suppliers 110 provide raw materials or components to each of the subcontractors and to the manufacturer 100. All of the above tasks are performed in different subcontractor factories and these factories are sometimes located in different countries. It is the responsibility of the manufacturer to manage the simultaneous activities among all the subcontractors.

One of the challenges of the approach described in FIG. 1 is to allow customers to specify special manufacturing requirements of an integrated circuit design and to have the ability to track such customer special requirements throughout the manufacturing process. The ability to support customer special requirements permits a manufacturer to offer more services. For example, to achieve the best performance, many integrated circuit devices are designed to push the limits of the manufacturing process technology. Designers need to experiment with certain manufacturing process parameters in order to obtain the best results. Therefore, there is a need for a method and system that support customer special requirements and track such requirements throughout the manufacturing process while managing multiple subcontractors in remote locations effectively.

Another challenge of the approach described in FIG. 1 is that the activities occurring in all subcontractor factories need to be synchronized to ensure maximum utilization of production capacity. This problem is especially acute when ensuring that sufficient quantities of die are available to satisfy the special requirements of customers while at the same time minimizing unnecessary inventory buildup in the manufacturer's and subcontractors' warehouses.

SUMMARY OF THE INVENTION

Disclosed are a method and system for manufacturing integrated circuits meeting special customer requirements with multiple subcontractors in remote locations. The disclosed manufacturing automation execution system detects customer special requirements and keeps track of such special requirements throughout the manufacturing process. The system accesses various databases to retrieve relevant data for determining and issuing electronic die release orders to subcontractors in remote locations. The disclosed method and system enable a broader range of services in manufacturing of integrated circuits.

BRIEF DESCRIPTION OF THE DRAWINGS

The aforementioned features and advantages of the invention as well as additional features and advantages thereof will be more clearly understood hereinafter as a result of a detailed description of a preferred embodiment of the invention when taken in conjunction with the following drawings in which.

DETAILED DESCRIPTION

The following description is provided to enable a person skilled in the art to which the invention pertains to make and use the invention and sets forth the best modes presently contemplated by the inventors for carrying out the invention. Various modifications, however, will remain readily apparent to those skilled in the art. Any and all such modifications, equivalents and alternatives are intended to fall within the spirit and scope of the presently claimed invention.

Manufacturing Automation Execution System

Figure 1:
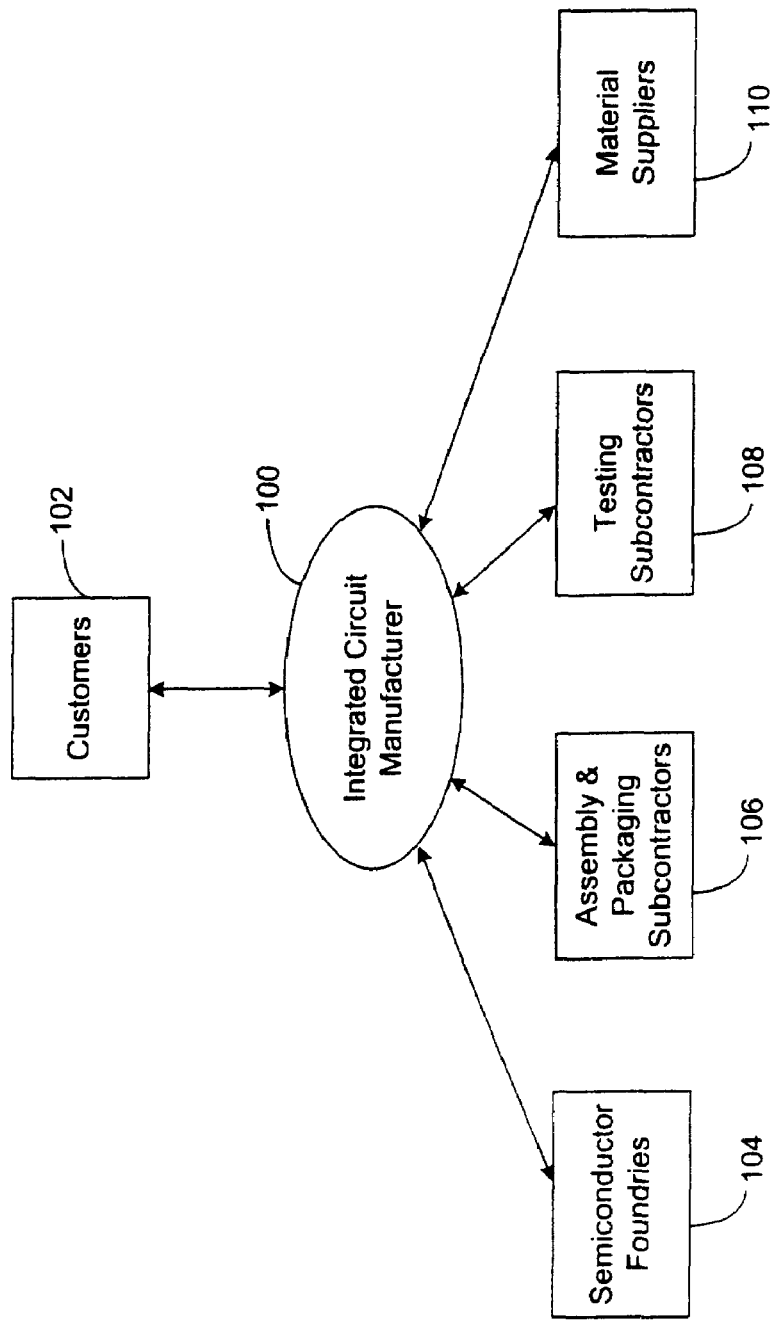
FIG. 1 illustrates the involvement among multiple companies in manufacturing semiconductor integrated circuit devices.
Figure 2:
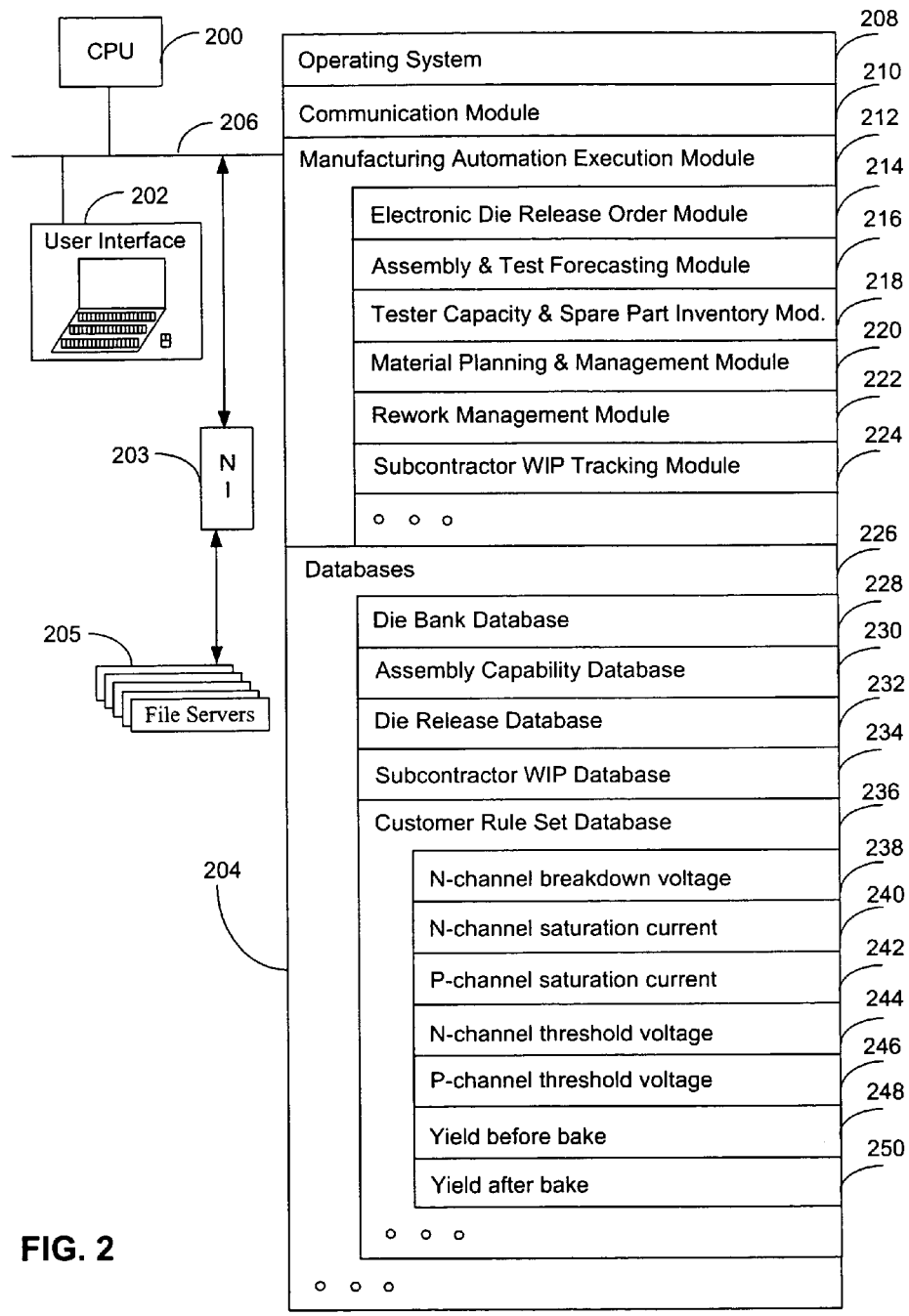
FIG. 2 illustrates a computer system running an integrated circuit manufacturing automation execution system.

In a preferred embodiment, a manufacturing automation execution (MAX) system is implemented using a computer system shown in FIG. 2. The computer system comprises one or more processing units (CPU's) 200, at least one network or other communications interface 203, a memory device 204, and one or more communication busses 206 for interconnecting these components. The MAX system may optionally have a user interface 202.

The memory 204 may include high-speed random access memory and may also include non-volatile memory, such as one or more magnetic disk storage devices. The memory 204 may include mass storage that is remotely located from the central processing unit(s) 200. The memory 204 preferably stores:

an operating system 208 that includes procedures for handling various basic system services and for performing hardware dependent tasks;

a communication module 210 that is used for controlling the communication between the system and various file servers 205 via the network interface(s) 203 and one or more communication networks, such as the Internet, other wide area networks, local area networks, metropolitan area networks, and so on;

a manufacturing automation execution module 212, for implementing many of the main aspects of the present invention, including an electronic die release order module 214, an assembly & test forecasting module 216, a tester capacity and spare part inventory module 218, a material planning & management module 220, a rework management module 222 and a subcontractor work in progress (WIP) tracking module 224; and Databases 226, including die bank database 228, assembly capability database 230, die release database 232, subcontractor WIP database 234, and customer rule set database 236.

The die bank database 228 stores the details of wafer lots available in the manufacturer's die bank. It includes information identifying the location, die type, age, wafer quantity, customer-special requirement tag, vendor lot number, lot comments, lot hold status, and wafer comments.

The assembly capability database 230 stores the qualification status of each subcontractor with respect to the assembly of a particular integrated circuit device. It includes information describing the bonding diagram, die type, package type, pin count, grade, test code, MSL code, customer process flow (CPF) code, pad size, pad pitch, subcontractor site status, latest revision number, active document deviations, and material status qualification codes for each site-device-package-bonding diagram combination.

The die release database 232 stores assembly and test instructions for lots released from the die bank database to subcontractors. It includes information about each fabricated lot, released lot, assembly site, test site, product, package, wafer identifications in lot, bonding diagram used, labels, date code, required ship date, and expedite handling information.

The subcontractor WIP database 234 stores information reflecting the manufacturer's WIP lot details updated daily by the subcontractor. It includes information such as subcontractor code, source/target device, vendor lot number, operation location, lot status, hold code and description, original ship-out date, current ship-out date, assembly quantity, test quantity, and current quantity.

The customer rule set database 236 stores various specialized customer requirements for certain integrated circuit devices. Information such as special test programs, special lot number indicator, special rule effective date, special bonding diagram to be used, and top marking specifications are kept in this database. In addition, this database stores manufacturing process parameters such as n-channel breakdown voltage 238, n-channel saturation current 240, p-channel saturation current 242, n-channel threshold voltage 244, p-channel threshold voltage 246, yield before bake 248, and yield after bake 250.

The MAX module 212 and the databases 226 may include executable procedures, sub-modules, tables and other data structures.

In other embodiments, additional or different modules and data structures may be used, and some of the modules and/or data structures listed above may not be used. Additional or different information may be stored in the databases, and some of the information listed in the above databases may not be used.

Manufacturing Automation Execution System Architecture

Figure 3:
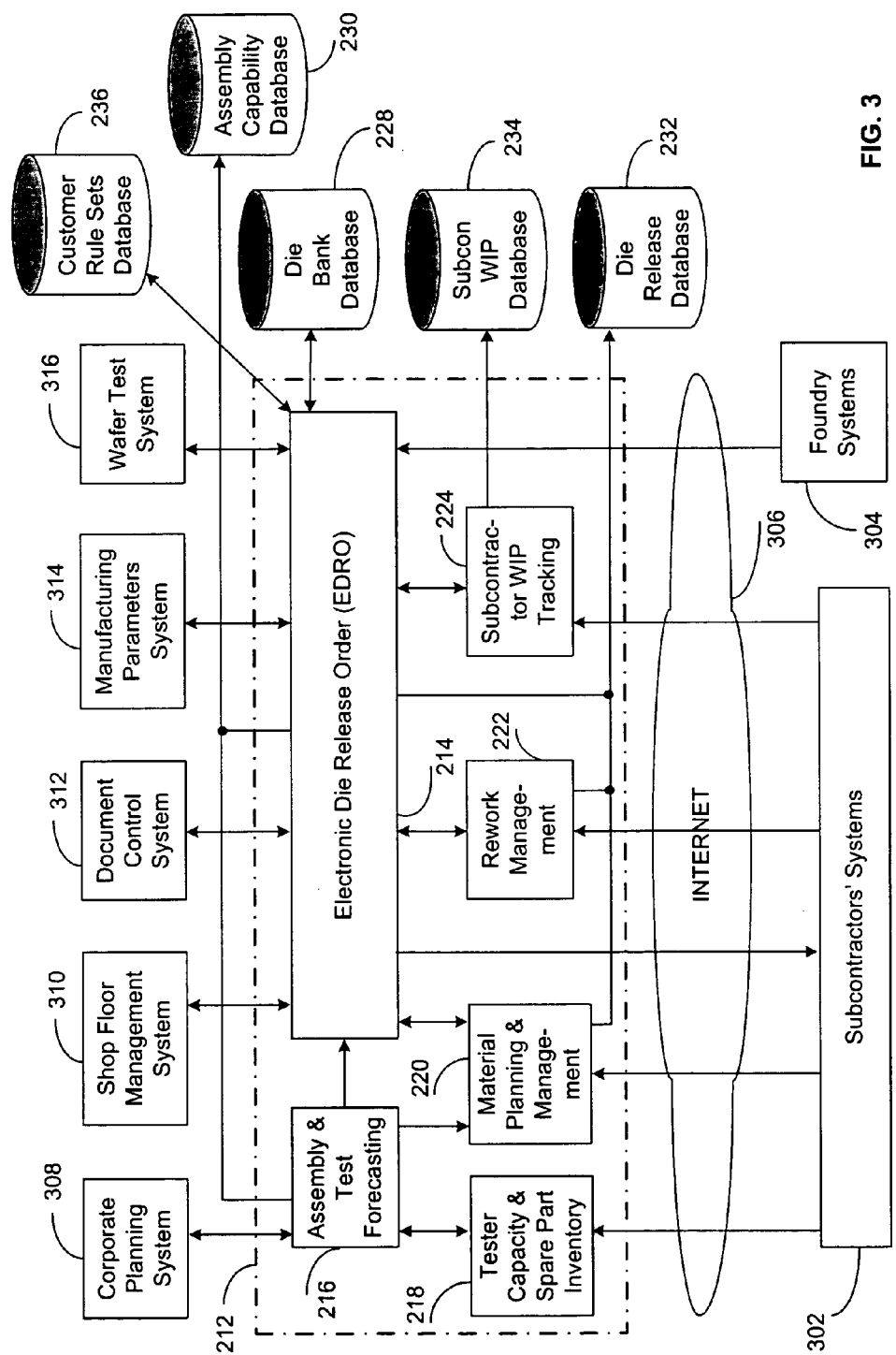
FIG. 3 illustrates a preferred architecture of an integrated circuit manufacturing automation execution system.

FIG. 3 depicts an illustrative embodiment of a preferred architecture of the manufacturing automation execution (MAX) system 212. As indicated in FIG. 2, the MAX system 212 comprises an electronic die release order (EDRO) module 214, an assembly & test forecasting module 216, a tester capacity & spare part inventory module 218, a material planning & management module 220, a rework management module 222 and a subcontractor work in progress (WIP) tracking module 224. These modules work collectively in data sharing and cross-functional controls.

Internally, the MAX system is supported by various computer systems within the manufacturer's computer network, such as a corporate planning system 308, a shop floor management system 310, a document control system 312, a manufacturing parameters system 314 and a wafer test system 316. The corporate planning system 308 determines assembly and test volume allocations to each subcontractor according to the subcontractor's respective qualifications and predetermined business criteria. The shop floor management system 310 tracks lot movements from die bank, assembly, testing to finished goods store. It facilitates the processing of wafer lots via a predefined series of routes. The document control system 312 maintains specifications of each subcontractor's manufacturing technologies, integrated circuit packages and testing capabilities. The manufacturing parameter system 314 maintains information such as assembly-qualified sites and their device process capabilities. The wafer test system performs testing of wafers to determine if the wafers pass customer requirements at the wafer sort process. Externally, the MAX system communicates with subcontractors' systems 302 and foundry systems 304 via the Internet 306.

The following is a description of the modules within the manufacturing automation execution system 212.

Electronic Die Release Order (EDRO) Module 214

The EDRO module 214 collects wafer records from foundries, and maps such records to the shop floor management system 310 on a daily basis. In addition, control parameters that are related to assembly qualified sites and their device process capabilities, bonding diagrams and other specification details are refreshed daily with data from the document control system 312 and manufacturing parameter system 314. Local control tables are maintained and information is temporarily stored that is not readily available elsewhere in the manufacturer's database system.

Manufacturing personnel have the alternative of manually selecting wafers/lots themselves or programming the EDRO module to allocate the wafers/lots for them based on criteria entered via a web-based user interface which is driven by the Active Server Page of the Internet Information engine. Die release parameters are validated against a set of predefined logic rules, and an array of control parameter tables is used to check against potential errors and lot processing delays.

All EDRO transactions generated are transferred automatically into the shop floor management system 310 for update. The shop floor management system tracks lot movements from die bank, assembly, testing to finished goods store. It facilitates the processing of wafer lots via a predefined series of routes. This step is implemented by transferring data via text files with transaction codes to reflect lot split, merge, ship and process records, and their corresponding field sets. The records of any legacy shop floor management systems are uploaded and translated using software scripts to conform to the database file structures. This data file conversion automation eliminates a time consuming and redundant manual data entry step in the shop floor management system 310.

At predefined delivery time windows, the EDRO records are saved into a file for each subcontractor and sent to the subcontractors via Internet FTP. The subcontractor receiver systems are preprogrammed to recognize the customized file format and parse the records and fields from the file accordingly. Linux scripts are used to provide intelligent system detection, recovery and alert mechanisms, ensuring that the data is completely and successfully delivered without the need for manual intervention. A link to the material planning and management module 220 permits the enforcement of soon-to-be obsolete piece-part material consumption priority, decrement of material quantity per expected consumption, and auto-alert on material shortages encountered at the EDRO transaction level. This die release transaction user interface is implemented using the Microsoft Open Database Connectivity (ODBC) interface.

Assembly & Test Forecasting Module 216

The assembly and test forecasting module 216 retrieves daily forecast numbers for assembly and test volumes from a file generated by the corporate planning system 308 and uploads the information into an assembly capability database 230. The forecasted assembly and test volumes are allocated to the various subcontractors according to their respective qualifications and business criteria. Reports are generated and emailed to the subcontractors respectively.

The forecasted allocation data from the corporate planning system 308 is read by the tester capacity & spare part inventory module 218 and the materials planning & management module 220 via the Microsoft ODBC interface. The benefit of maintaining a single forecast data source is to preserve data integrity and consistency throughout the systems used in offshore planning. Any records generated can be readily accessible immediately by the other modules without any intermediate processing, thereby eliminating manual compilation work, redundant data transfer, duplications and storage overheads.

Tester Capacity & Spare Part Inventory Module 218

The tester capacity and spare part inventory module 218 produces a projected tester utilization report based on the test forecasts from the subcontractors 302. The relevant data is readily accessible on demand from the subcontractors.

The tester records and their relevant spare-parts inventory are maintained in the assembly capability database 230. Subcontractors provide periodic updates to the assembly capability database. The expected yield of the tester is computed based on a set of user-defined parameters and formulae for each tester type and configuration. The available reports provide visibility for the tester utilization at each subcontractor site, and they highlight any component shortages in advance.

A capacity analysis tool is used for simulating different tester capacity utilization scenarios and suggesting reallocations where necessary.

Material Planning & Management Module 220

An online data bridge between the MAX system 212 and each subcontractor is established using the Internet 306. Depending on system capabilities or preferences, subcontractors generate the files based on a predefined standardized field sequence using either fixed field length or comma delimiter formats. Microsoft Structured Query Language (SQL) Server Bulk Copy Program (BCP) scripts are customized for each subcontractor to facilitate data entry into databases. Data on the piece-part material current inventory levels and materials on order are updated on a weekly basis.

Using data received from the assembly & test forecasting module and the EDRO module, the material planning and management module 220 provides tools to facilitate proactive activities such as anticipating potential material shortages, avoidance of unnecessary holding costs, prevention of excess material purchases, and keeping material obsolescence to minimum possible levels. To enforce priority use of soon-to-be obsolete but usable piece-part materials, the material planning and management module 220 provides an interface to the EDRO module, which has a mechanism to prioritize the usage of soon-to-be obsolete materials first in the electronic die release order transactions.

As electronic die release orders are processed, the material planning and management module 220 reduces the material piece-part quantities accordingly as materials are consumed. This step provides realtime visibility of the current material inventory levels at each subcontractor site. The material planning and management module 220 automatically sends out emails to material supply management personnel notifying them if there are material shortages for fulfilling the electronic die release orders. This electronic alerting mechanism allows prompt action in expediting delivery of materials on order.

Rework Management Module 222

The rework management module 222 is linked to the EDRO module 214, sharing the same die release database 232 with the EDRO module. As rework orders are conducted, the original lot attributes such as date codes are extracted from the die release database. The rework management module helps to cut down data entry activities, and ensures data accuracy.

On demand, the rework management module 222 generates a rework request file in Microsoft Excel format and sends the file to the subcontractor where the rework is performed. The status of the rework lots is then extracted from the returned rework file and updated into the die release database 232 via a custom Microsoft Excel Visual Basic for Applications (VBA) program using the Microsoft ODBC interface.

Subcontractor WIP Tracking Module 224

The subcontractor WIP tracking module 224 generates subcontractor WIP data and report files at least once daily. These files are extracted over the Internet via FTP from a subcontractor WIP database. Each subcontractor WIP system may use a subcontractor unique report format. In order to avoid burdening scarce subcontractor information system resources in developing a standardized format, the subcontractor WIP tracking module uses existing reports. This is achieved by developing Linux scripts with powerful text processing tools to read different report formats and process the report data into a format which is optimized for direct database upload using the built-in Microsoft SQL BCP utilities.

The subcontractor WIP tracking module 224 also creates a WIP summary report for data received from each subcontractor. This WIP summary report which is stored in the subcontractor WIP database 234 contains each subcontractor's WIP tables, with irrelevant data filtered. The WIP summary report is used to derive various reports on demand, each displaying WIP information from different user perspectives. The lot information is linked back to the EDRO transaction details via hyperlinked Active Server Pages program scripts of the Microsoft SQL servers.

The module maintains a process map for correlating manufacturer's process names with that of the subcontractors'. This is used to standardize and clarify the process descriptions in the WIP reports among all subcontractors. The module further determines any assembly lot that fails to start on time per EDRO instructions by matching the expected lot number in the WIP report.

Managing Customer Special Requirements

Managing & Updating Die Bank Database

Figure 4:
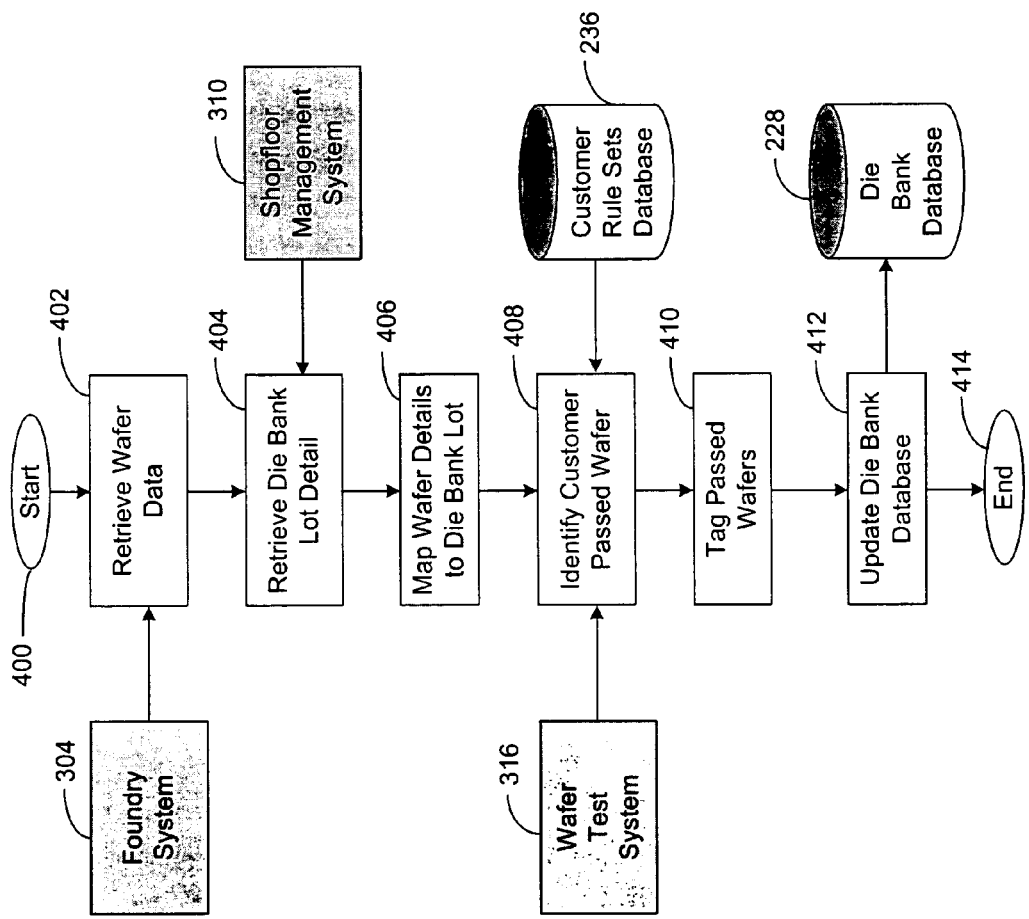
FIG. 4 illustrates a method for managing and updating the die bank database.

FIG. 4 illustrates a method for managing and updating the die bank database 228. The method starts in block 400 and moves to step 402 where the MAX system retrieves wafer data from a foundry system 304. Wafer data is stored in a standardized text file format known as a Wafer Probe Record (WPR). The WPR contains wafer composition details such as wafer number, good die quantity and die type. One WPR file is created for each lot. In a predetermined time interval, the foundry system saves WPR in a foundry data file server. At a designated time interval, the MAX system accesses the foundry server and retrieves the WPR file over the Internet using FTP protocols. The WPR file from each foundry is then parsed to obtain wafer records, and such wafer records is then stored in the die bank database 228.

In step 404, the MAX system retrieves die bank inventory data from the shop floor management system 310. In step 406, the MAX system compares wafer details retrieved from foundries to the die bank inventory data stored in the shop floor management system. Only matched lots are made available for the next step of identifying customer-qualified wafers.

In step 408, the system retrieves a list of customer qualified wafer records from the wafer test system 316 in accordance with the customer special requirements stored in the customer rule sets database 236. In step 410, the wafer records are scanned and tagged to denote that they are special customer-qualified wafers. In step 412, the system updates the die bank database 228 with wafer records that are tagged as special customer-qualified wafers. The method ends in block 414.

Managing & Updating Assembly Capability Database

Figure 5:
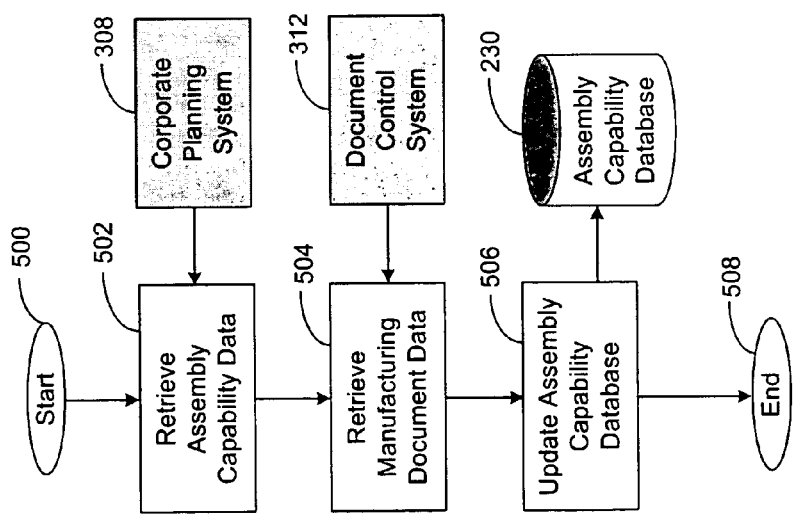
FIG. 5 illustrates a method for managing and updating the assembly and test capability database.

FIG. 5 illustrates a method for managing and updating assembly capability database 230. The method starts in block 500 and moves to block 502 where the MAX system retrieves assembly capability data. Control data such as qualified subcontractors and their device process capabilities, die type, package type and bonding diagrams are retrieved from the corporate planning system 308.

In step 504, the system further retrieves manufacturing document data where the latest document revision numbers for bonding diagrams are extracted from the document control system 312. In step 506, the MAX system updates the assembly capability database 230 with the information retrieved in steps 502 and 504. The method ends in step 508.

Monitoring Subcontractor Work In Progress Status

Once an EDRO of a lot is issued, the lot is released for assembly from the die bank database within a predefined period of time. If the released lot appears in the daily subcontractor WIP report, it indicates that the lot has started in production. Manufacturing personnel can determine that certain lots are behind schedule if they have not shown up in the WIP report after the expected lead-time from the receipt of the EDRO transaction. Manufacturing personnel can then follow up with the subcontractors on the lots that are behind schedule to expedite their release into assembly. In the event that the delay is inevitable, they can opt to reschedule lots in the finished goods inventory (FGI) to service the more urgent production lots.

Figure 6:
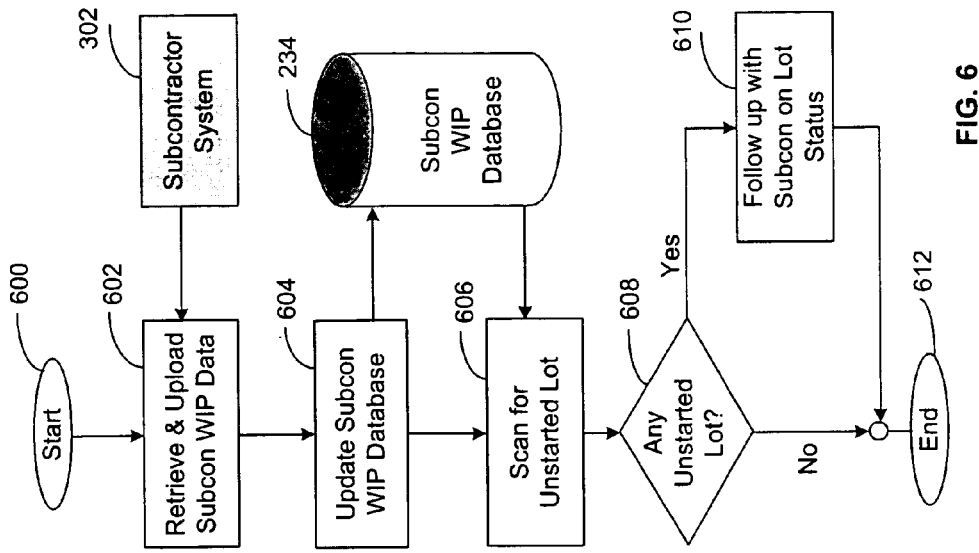
FIG. 6 illustrates a method for monitoring subcontractor work in progress (WIP) status.

FIG. 6 illustrates a method for monitoring subcontractor work-in-progress status. The method starts in block 600. In step 602, the system retrieves subcontractor WIP data from each subcontractor system 302 via the Internet. The WIP data is preprocessed into a format optimized for uploading into the MAX system. Next, in step 604, the method updates the subcontractor WIP database 234. Upon updating the subcontractor WIP database, the system scans the WIP database EDRO released lots in step 606.

In step 608, a determination is made whether there is any previously released EDRO lot that the production process has not yet started. If there is, the method moves to step 610 where the system sends an email to responsible personnel to follow up with subcontractor on the lot status. From the WIP report, manufacturer personnel can contact the subcontractors to find out the cause of the delay and expedite if possible. In the alternative, if the production process for all the EDRO released lots has been started, the method ends in step 612.

Managing Customer Special Requirements

Figure 7:
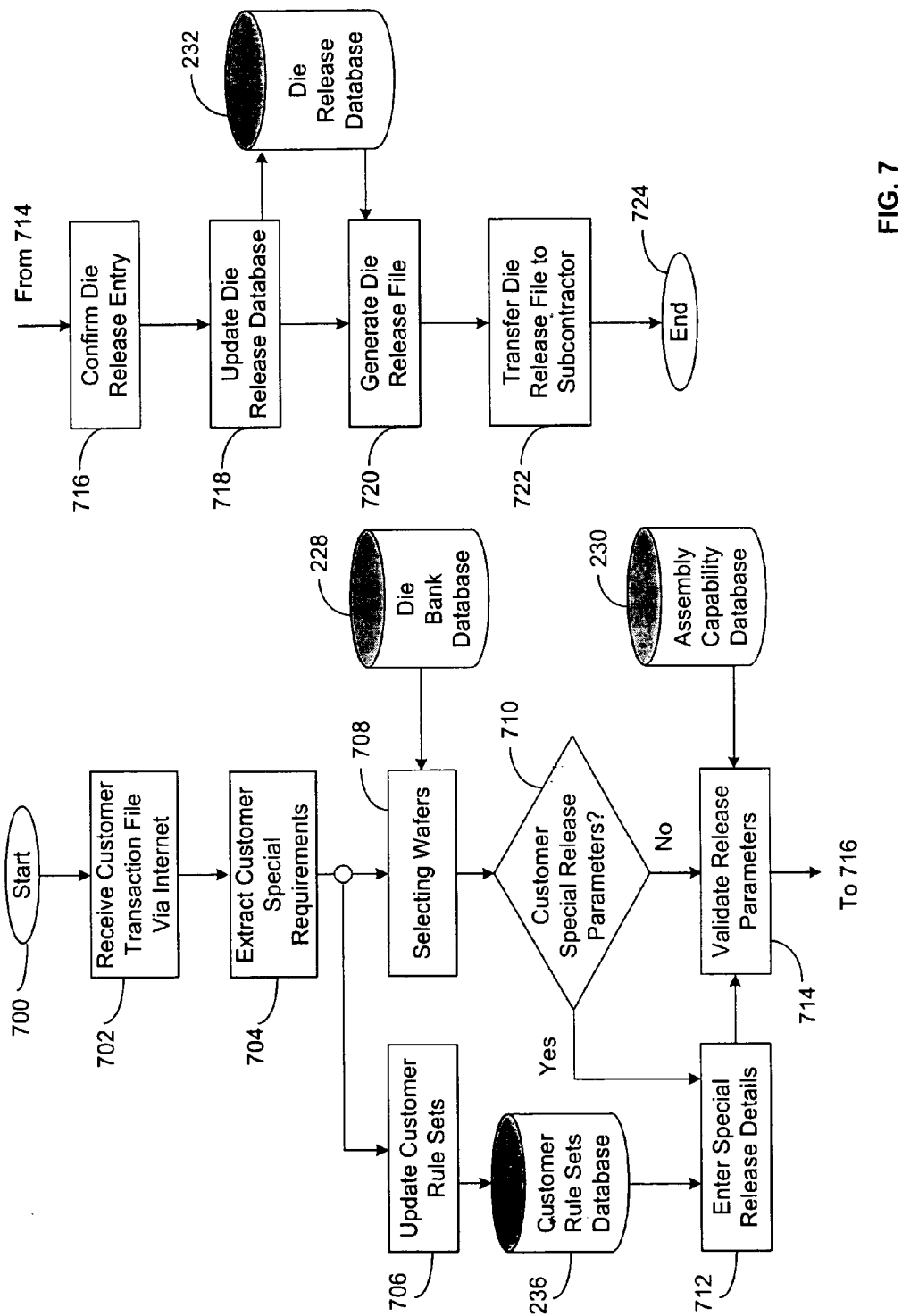
FIG. 7 illustrates a method for manufacturing integrated circuits meeting customer special requirements with multiple subcontractors in remote locations.

FIG. 7 illustrates a method for manufacturing integrated circuits meeting customer special requirements using multiple subcontractors in remote locations. The method starts in step 700 and thereafter moves to step 702 where the MAX system receives a customer transaction file via the Internet. In step 704, the MAX system parses the customer transaction file to extract customer special requirements. For example, a certain customer has specific requirements that wafers used must pass a predetermined set of electrical criteria, such as the n-channel breakdown voltage 238 and the n-channel saturation current 240, in order for them to be used in manufacturing integrated circuit devices. As a result, the manufacturer needs to perform wafer tests and generate a list of qualified wafers in the die bank database 228. Thereafter, when an EDRO transaction is generated for the specific device, the MAX system can ensure that only customer-qualified wafers are utilized or else it will stop the transaction from proceeding.

In step 706, the system updates customer rule sets database 236 with information extracted in step 704. Whenever new requirements or changes in customer special requirements are provided, such information is updated in the customer rule set database 236.

In step 708, the MAX system automatically selects wafers within a lot to be used based on a first-in-first-out (FIFO) shelf life mechanism. It picks wafers by die type from a foundry lot in the die bank database 228. Quite often, not all wafers in a lot are required to full fill a customer's order and hence not all wafers are selected from the lot. This procedure of separating a group of wafers in a lot is called 'lot splitting'. In this case, the original lot is called a 'parent lot', and the new lot that contains the selected wafers is called a child lot. The system issues a new lot number for the child lot and the parent lot remains in the die bank database 228.

In step 710, a determination is made as to whether there are any customer special release parameters by examining the first character of a lot number, which is marked to indicate a customer-qualified wafer lot. If there is no customer special parameters, the method continues at step 714.

In the alternative, the method goes to step 712 where the system validates any special release details by checking wafers selected in step 708. If one or more wafers are found not to be customer-qualified, the system prompts an error message and repeats the process of wafer selection. Certain special release details, such as EDRO assembly site, wafer number, lot number, marking instructions, due date, and bonding diagram are entered in the system. This step is important because if there were engineering issues during the manufacturing process, having special release details of the affected lots can greatly help troubleshooting the problematic die. In addition, the parent lot and its child lots can be identified and recalled from the production floor, avoiding unnecessary scrappage and therefore reducing adverse impact on production costs.

In step 714, subsequent to selecting wafers and entering special release details, the system validates such release parameters by checking the special release details entered in step 712 versus the parameters stored in assembly capability database 230. It prompts for correction if any error is found. The newly entered special release details are used to derive other essential data to complete the EDRO transaction.

In step 716, the system displays final details of the EDRO transaction and requests the manufacturing personnel to confirm the electronic die release order. In step 718, the system updates the die release database 232 with the new EDRO records. At this point, the new EDRO records in the die release database 232 are ready for electronic transmission to subcontractors 302 over the Internet 306.

In step 720, the system generates the die release file for transmission to subcontractors 302. At a predetermined time window, the system scans the die release database 232 for any new EDRO records. The new EDRO records for each subcontractor are separated and written into text files in a standardized field sequence.

In step 722, the system transfers die release file to each subcontractor. The system first establishes a file transfer protocol (FTP) connection and then sends each file to the corresponding subcontractor's file server. After a file transfer, a listing of the directory storing the transferred file is fetched from the subcontractor's file server and the file size reported therein is checked against the original file transferred. If the sizes of the transferred file and the received file do not match, the file transfer process is repeated. This file transfer checking and retrying process will be repeated until the sizes of the transferred file and the received file match or until a predetermined maximum number of tries are made. If the file transfer is still unsuccessful after the maximum number of tries are made, which may occur if the subcontractor's computer system is down, the data is accumulated for the next FTP transmission window. In an alternative embodiment of the disclosure, if the file transfer error persists, the system sends an email to alert responsible personnel of the error condition. The method ends in step 724.

The MAX system provides at least four important advantages for manufacturing of integrated circuits with multiple subcontractors in remote locations. First, it supports customer special requirements. The system performs tracking of customer special requirements with minimal impact to the existing manufacturing process. Second, it simplifies the process of placing electronic die release orders to subcontractors. As a result, there is significant reduction in manual activities and process time required for both the manufacturer and the subcontractors. Third, the system eliminates the need to use multiple standalone computer systems by replacing the process with a convenient and user-friendly one-stop center for customer transactions. Fourth, it improves the accuracy of electronic die release orders through automatic validation of input data from subcontractors and automatic derivation of information using various application programs and scripts. This system reduces delay in fulfilling customer orders and reduces the possibility of building wrong products.

One skilled in the relevant art will easily recognize that various modifications of this disclosure can work well for the inventive manufacturing automation execution system while preserving the spirit of the present invention. For example, different modules of the system can be executed by one or more servers on the manufacturer's computer network, and various databases can reside in one or more file servers either located locally or in remote locations.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for manufacturing integrated circuits meeting customer special requirements with multiple subcontractors in remote locations, comprising the steps of:
   receiving a customer transaction file via the Internet;
   extracting a set of customer special requirements from said transaction file;
   updating a customer rule set database with the set of customer special requirements:
   selecting partially-processed wafers identified in a die bank database in accordance with said customer rule set database;
   validating special release requirements for said selected wafers in accordance with an assembly capability database that stores capabilities of each subcontractor; and
   issuing electronic die release orders for release of said selected wafers from a die bank to at least one of a plurality of subcontractors for further processing.

2. The method of claim 1, further comprising the steps of:
   retrieving wafer data from foundry subcontractors via the Internet;
   retrieving die bank lot details from a shop floor management system;
   mapping said wafer data to said die bank lot; and
   updating said die bank database with said wafer data.

3. The method of claim 1, further comprising the steps of:
   retrieving assembly capability data from a corporate planning system;
   retrieving manufacturing document data from a document control system; and
   updating said assembly capability database with said assembly capability data and said manufacturing document data.

4. The method of claim 1, wherein selecting wafers in a die bank database further comprises the steps of:
   identifying wafers that meet customer special requirements in accordance with information obtained from a wafer test system;

tagging said wafers; and
updating said die bank database.

5. The method of claim 1, wherein validating special release parameters comprises the steps of:
retrieving customer special release details from said customer rule set database;
retrieving assembly capabilities of subcontractors from said assembly capability database, and
validating said customer special release details against said assembly capabilities of subcontractors.

6. The method of claim 1, wherein issuing electronic die release orders to a plurality of subcontractors comprises the steps of:
generating an electronic die release order file for said selected wafers and said validated special release requirements; and
transferring said electronic die release order file to subcontractors via the Internet.

7. The method of claim 1, wherein said customer special requirements contain at least one parameter selected from the group consisting of n-channel breakdown voltage, n-channel saturation current, p-channel saturation current, n-channel threshold voltage, p-channel threshold voltage, yield before bake and yield after bake.

8. A computer readable medium carrying one or more sequences of one or more instructions for manufacturing integrated circuits meeting customer special requirements with multiple subcontractors in remote locations, wherein the execution of the one or more sequences of the one or more instructions causes the one or more processors to perform the steps of:
receiving a customer transaction file via the Internet;
extracting a set of customer special requirements from said transaction file;
updating a customer rule set database with the set of customer special requirements;
selecting partially-processed wafers identified in a die bank database in accordance with said customer rule set database;
validating special release requirements for said selected wafers in accordance with an assembly capability database that stores capabilities of each subcontractor; and
issuing electronic die release orders for release of said selected wafers from a die bank to at least one of a plurality of subcontractors for further processing.

9. The computer readable medium of claim 8 further comprising sequences of instructions for performing the steps of:
retrieving wafer data from foundry subcontractors via the Internet,
retrieving die bank lot details from a shop floor management system; mapping said wafer data to said die bank lot; and
updating said die bank database with said wafer data.

10. The computer readable medium of claim 8 further comprising sequences of instructions for performing the steps of:
retrieving assembly capability data from a corporate planning system;
retrieving manufacturing document data from a document control system; and
updating said assembly capability database with said assembly capability data and said manufacturing document data.

11. The computer readable medium of claim 8, wherein the instructions for performing the step of selecting wafers in a die bank database comprise instructions for performing the steps of:
identifying wafers that meet customer special requirements in accordance with information obtained from a wafer test system;
tagging said wafers; and
updating said die bank database.

12. The computer readable medium of claim 8, wherein the instructions for performing the step of validating special release parameters comprise instructions for performing the steps of:
retrieving customer special release details from said customer rule set database;
retrieving assembly capabilities of subcontractors from said assembly capability database; and
validating said customer special release details against said assembly capabilities of subcontractors.

13. The computer readable medium of claim 8, wherein the instructions for performing the step of issuing electronic die release orders to a plurality of subcontractors comprise instructions for performing the steps of:
generating an electronic die release order file for said selected wafers and said validated special release requirements; and
transferring said electronic die release order file to subcontractors via the Internet.

14. The computer readable medium of claim 8, wherein said customer special requirements contain at least one parameter selected from the group consisting of n-channel breakdown voltage, n-channel saturation current, p-channel saturation current, n-channel threshold voltage, p-channel threshold voltage, yield before bake and yield after bake.

15. A system for manufacturing integrated circuits meeting customer-special requirements with multiple subcontractors in remote locations, the system comprising:
at least one processing unit for executing computer programs;
at least one user interface for communicating with said computer programs;
at least one network interface for exchanging information with file servers and subcontractor computer systems, the information exchanged including information concerning manufacturing databases;
a manufacturing automation execution module including one or more computer programs, said computer programs including instructions for:
receiving a customer transaction file via the Internet;
extracting a set of customer special requirements from said transaction file;
updating a customer rule set database with the set of customer special requirements;
selecting partially-processed wafers identified in a die bank database in accordance with said customer rule set database;
validating special release requirements for said selected wafers in accordance with an assembly capability database that stores capabilities of each subcontractor; and
issuing electronic die release orders for release of said selected wafers from a die bank to at least one of a plurality of subcontractors for further processing.

16. The system of claim 15, wherein the computer programs of said manufacturing automation execution module further include instructions for:
retrieving wafer data from foundry subcontractors via the Internet; retrieving die bank lot details from a shop floor management system; mapping said wafer data to said die bank lot; and
updating said die bank database with said wafer data.

17. The system of claim 15, wherein the computer programs of said manufacturing automation execution module further include instructions for:

retrieving assembly capability data from a corporate planning system;

retrieving manufacturing document data from a document control system; and updating said assembly capability database with said assembly capability data and said manufacturing document data.

18. The system of claim 15, wherein the instructions for performing the step of selecting wafers in a die bank database include instructions for:

identifying wafers that meet customer special requirements in accordance with information obtained from a wafer test system;

tagging said wafers; and updating said die bank database.

19. The system of claim 15, wherein the instructions for performing the step of validating special release parameters include instructions for:

retrieving customer special release details from said customer rule set database;

retrieving assembly capabilities of subcontractors from said assembly capability database; and validating said customer special release details against said assembly capabilities of subcontractors.

20. The system of claim 15, wherein the instructions for performing the step of issuing electronic die release orders to a plurality of subcontractors include instructions for:

generating an electronic die release order file for said selected wafers and said validated special release requirements; and transferring said electronic die release order file to subcontractors via the Internet.

21. The system of claim 15, wherein said customer special requirements contain at least one parameter selected from the group consisting of n-channel breakdown voltage, n-channel saturation current, p-channel saturation current, n-channel threshold voltage, p-channel threshold voltage, yield before bake and yield after bake.

* * * * *